US012668267B1

(12) United States Patent
Filarsky

(10) Patent No.: US 12,668,267 B1
(45) Date of Patent: Jun. 30, 2026

(54) SPLIT PROFILE TRAJECTORIES

(71) Applicant: Zoox, Inc., Foster City, CA (US)

(72) Inventor: Brian Michael Filarsky, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 493 days.

(21) Appl. No.: 18/087,091

(22) Filed: Dec. 22, 2022

(51) Int. Cl.
B60W 60/00 (2020.01)
B60W 30/095 (2012.01)

(52) U.S. Cl.
CPC ...... B60W 60/001 (2020.02); B60W 30/0956 (2013.01); *B60W 2554/4041* (2020.02)

(58) Field of Classification Search
None
See application file for complete search history.

(56) References Cited

U.S. PATENT DOCUMENTS

| | | | | |
|---|---|---|---|---|
| 2018/0348767 A1* | 12/2018 | Jafari Tafti | ............ | G08G 1/166 |
| 2019/0369616 A1* | 12/2019 | Ostafew | ............... | G08G 1/0112 |
| 2021/0347381 A1* | 11/2021 | Zhu | ........................ | B60W 10/04 |

* cited by examiner

*Primary Examiner* — Jason Holloway
*Assistant Examiner* — Christopher A Buksa
(74) *Attorney, Agent, or Firm* — EIP US LLP

(57) ABSTRACT

Trajectories, such as for autonomous vehicles, are provided. The trajectories may be defined by a geometric profile and a temporal profile. The geometric profile defines a path through an environment independent of time. The temporal profile defines desired states of the vehicle along the path at defined points in time. In some examples, one of the profiles is modified to provide a modified profile. The vehicle is controlled at least in part on the modified profile on the other of the geometric profile and the temporal profile.

20 Claims, 6 Drawing Sheets

200

Generate trajectory comprising
geometric profile and temporal profile
202

Control vehicle in accordance with
geometric and temporal profile 204

Control vehicle in accordance with
geometric profile after end of spatial
profile 206

400

Receive trajectory defined by a geometric profile and a temporal profile <u>402</u>

Determine modification of the geometric or temporal profile <u>404</u>

Control vehicle based on modified profile <u>406</u>

SPLIT PROFILE TRAJECTORIES

BACKGROUND

Autonomous driving may benefit from computing systems capable of determining driving paths and navigating along routes from an initial location toward a destination. For example, autonomous and semi-autonomous vehicles may utilize systems and components to traverse through driving environments including other objects, such as moving or stationary vehicles (autonomous or otherwise), pedestrians, buildings, etc. When traversing through such an environment, the vehicle may determine a trajectory based on sensor data from the perception systems of the vehicle, as well as map data of the environment. For example, a planning system within an autonomous or semi-autonomous vehicle may determine a trajectory and a corresponding set of actions for the vehicle to take to navigate in an operating environment.

BRIEF DESCRIPTION OF DRA WINGS

The detailed description is described with reference to the accompanying figures. The use of the same reference numbers in different figures indicates similar or identical components or features.

DETAILED DESCRIPTION

Figure 1:
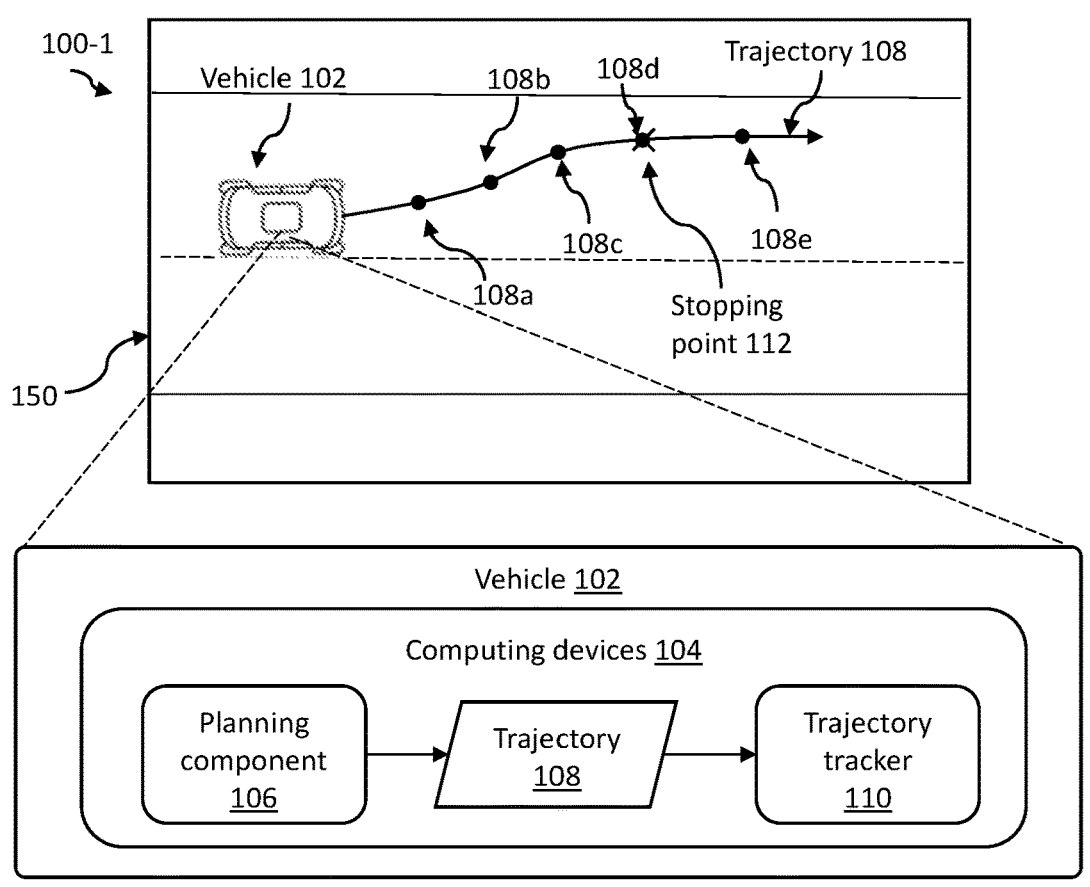
FIG. 1 illustrates a vehicle controlled in accordance with a trajectory with a geometric profile and a temporal profile according to techniques of a present disclosure.
Figure 1:
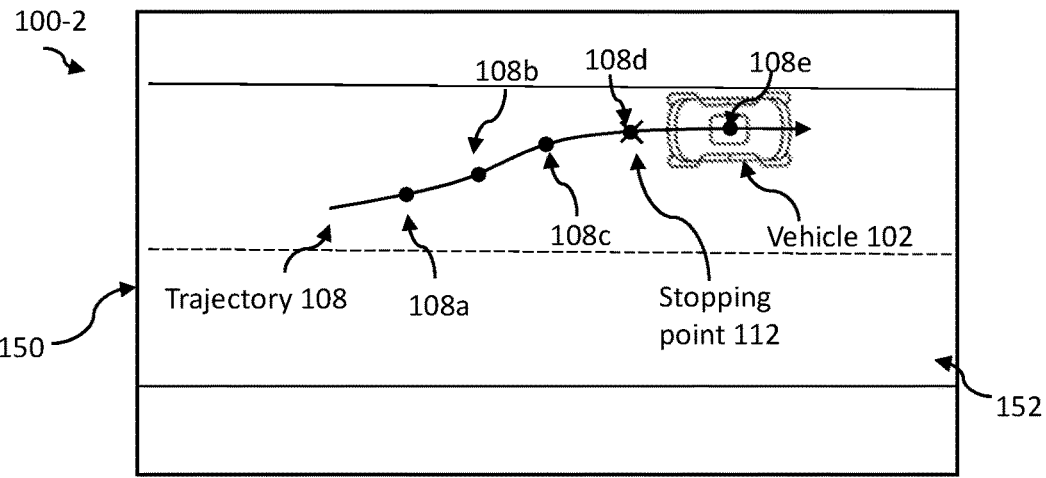

This application relates to determining and utilizing driving trajectories for vehicles, such as autonomous and semi-autonomous vehicles. Techniques of the present disclosure provide a trajectory with separate (split) geometric and temporal profiles. A geometric profile may refer to a sequence of geometric states that may be time-independent. The sequence of geometric states may define a path through the environment. For example, a geometric state may specify expected values of position (e.g. position in the environment), heading/yaw, yaw rate, path curvature, sideslip, and/or distance along the path (e.g. arc length) for a vehicle following the trajectory. A temporal profile may refer to a relationship between distance along the path (e.g. arc length) and time. For example a temporal profile may specify expected values of distance along the path, time (e.g. at which the vehicle is expected to be at a specified distance along the path), speed, velocity, and/or acceleration. Both of the profiles may comprise a common parameter, e.g. arc length, which may enable mapping between the two profiles. The profiles may have different lengths and/or comprise different numbers of states. The profiles may be modified independently of each other, such that modification of one profile does not alter the other profile. As a non-limiting example of which, velocity may be altered in the temporal profile leaving lateral offsets, headings, etc. unchanged. The vehicle may be controlled in accordance with either one of the profiles. Thus, techniques of the present disclosure may provide greater flexibility in determination of trajectories. In contrast to the trajectories of the present techniques, conventional trajectories may typically comprise a sequence of spatiotemporal states. Each conventional spatiotemporal state may be considered to specify both 'where' and 'when' a vehicle is expected to be. In other words, conventionally the geometric aspects of the trajectory may be inextricably interlinked with the temporal aspects.

As illustrated below, the various examples and techniques described herein may be implemented in a number of ways to improve the operation of autonomous vehicles and the functioning of computing systems. For example, these techniques may improve the functioning, safety, and efficiency of autonomous and semi-autonomous vehicles operating in real-world driving environments, by providing improved driving trajectories through environments. For example, one or both of the geometric and temporal profiles may be modified to optimize for safety as a vehicle navigates an environment, and/or to optimize the trajectory based on the environment, for example to provide for improved progress or comfort through the environment. In a non-limiting example the temporal and/or geometric profile may be modified based on detecting a potential collision, for example as part of a collision avoidance system of a vehicle. In a further non-limiting example, the temporal and/or geometric profile may be modified based on one more predetermined driving policies, such as a safety, comfort, or progress policy. Further, techniques may improve the computational efficiency of controlling a vehicle. For example, modifying a temporal profile independently of a geometric profile (or vice versa) may require fewer computation resources than having to modify a full trajectory.

In some examples, a trajectory may be associated with bringing a vehicle to a stop. The geometric profile may define a path extending beyond an expected stopping position defined in the temporal profile. A vehicle may be controlled in accordance with the geometric profile and the temporal profile, such that the vehicle (approximately) follows the path. It would be expected that upon reaching the stopping position (i.e. the position on the path associated with the end of the sequence of temporal states), the vehicle would be stationary. However, there may be error in the actual stopping position of the vehicle. In particular, the vehicle may overshoot the expected stopping position. Indeed, for an unbiased vehicle controller the vehicle may overshoot the stopping position half of the time. Techniques of the present disclosure may ensure that even after the vehicle is expected to have stopped, there is still a defined path for the vehicle to follow in the case of overshoot. In at least some such cases, collision avoidance may be performed on one or more of the geometric and/or temporal profiles to ensure further safety (such as in those cases of overshoot). Thus, for example, the vehicle may be controlled in accordance with the geometric profile after the end of the sequence of temporal states/after the vehicle has passed the expected stopping position. In some examples a modified temporal profile may be determined to cause the vehicle to stop within a portion of the path extending beyond the expected stopping position. In some examples, the length of path defined by the geometric profile after the stopping position may be associated with a maximum overshoot distance. The maximum overshoot distance may be determined based on the environment, for example based on other objects around the vehicle. The length of path after the stopping position/maximum overshoot distance may determine a braking intensity. For example, in cases where there is an object in front of the vehicle, the length of path after the stopping position/maximum overshoot distance may be shorter than cases where no object is in front of the vehicle. The shorter path may indicate to a vehicle controller that more intense braking is required to minimize overshoot.

In some examples, one of the geometric profile and the temporal profile may be modified to provide a modified profile of the one of the geometric profile and the temporal profile. The vehicle may then be controlled based at least in part on the modified profile of the one of the geometric profile and the temporal profile, and based at least in part on the other of the geometric profile and the temporal profile. The other profile may be left unmodified, or may be independently modified, for example for a different purpose. In contrast, in conventional trajectories it may not be possible to generate a kinematically feasible modified trajectory without unintentionally changing both temporal and geometric values. Modifying only one profile may allow, for example, the temporal properties to be altered for a particular purpose without changing the geometric path. The geometric path may have been determined based on a large number of factors, for example by a machine learning model, to ensure safe operation of the vehicle (e.g., to avoid potential collisions), or otherwise and may have been optimized for particular driving scenarios. It may therefore not be desirable to alter such a path. Furthermore, modifying only one profile, rather than the intertwined spatiotemporal states of conventional trajectories, may be computationally simpler, making the generation of modified trajectories more computationally efficient.

In some examples, the temporal profile may be modified. In some such examples, the (initial) trajectory may represent a reference trajectory, for example as determined by a planning component of the vehicle. One or more contingent trajectories may be generated based on the reference trajectory, for example by a secondary system of the vehicle, such as a collision avoidance system. A contingent trajectory may be associated with slowing or stopping the vehicle. For example, a contingent trajectory may represent a 'safe-stop' trajectory to be used if a safety condition is met. Slowing or stopping the vehicle may relate to the temporal attributes of the vehicle, rather than the geometric attributes. Techniques of the present disclosure may allow the temporal profile to be modified without modifying the geometric profile. Thus a contingent trajectory may comprise a modified temporal profile (e.g. being the vehicle to a stop), and the unmodified geometric profile from the initial trajectory. This may avoid the modifications to the path that may result from contingent trajectory generation when using conventional trajectories. In particular, such examples may preserve a geometric profile determined by an optimization algorithm, thus maintaining an optimal path through the environment.

In some examples, a potential collision may be determined, based at least in part on the geometric profile. For example, a representation of the vehicle, such as a bounding box, may be propagated along the path defined by the geometric profile. An overlap between the representation of the vehicle (as propagated along the path) and a representation of an object may be identified, which may represent a potential collision. The object may be an object detected by sensor data, such as sensor data measured or derived from one or more sensors of the vehicle. The object may be a stationary object or a moving object. Where the object is a moving object, the representation of the object may be propagated along an object trajectory. For example, the object trajectory may represent a path the object is predicted to take, or may be a continuation of a path already travelled by the object. Where a potential collision has been determined, a modified temporal profile may be determined based at least in part on the potential collision. The modified temporal profile may slow or stop the vehicle, and may be used as part of a contingent trajectory, as discussed above. Alternatively or additionally, the geometric profile may be modified based on a detected potential collision. Such examples may in some cases by implemented by a secondary system of the vehicle such as a collision avoidance system of the vehicle, as discussed below in relation to FIG. 5.

In some examples, one or both of the geometric profile may be generated by an optimization process, such as an optimization algorithm or smoothing algorithm. An optimization algorithm may optimize a base trajectory based on one or more policies, such as safety or comfort policies. Such optimization may be performed by a planning component of the vehicle. The trajectory resulting from such optimization may be the reference trajectory discussed above. Methods of trajectory generation and optimization are described in U.S. patent application Ser. No. 17/900,258, filed Aug. 31, 2022, and entitled "Trajectory Optimization in Multi-Agent Environments", which is incorporated herein by reference in its entirety for all purposes.

Some examples may utilize spatial projection to determine controls for the vehicle based on the trajectory. Spatial projection may comprise projecting an actual position of the vehicle onto the trajectory, determining a difference between current vehicle properties (e.g. current heading, velocity, etc.) and expected properties for the current position/future positions, and controlling the vehicle based on said differences. Such projection may be performed by a tracker component. Accordingly, some examples may determine a current position of the vehicle, and may project the current position onto the path defined by the sequence of geometric states to determine a current distance along the path/point on the path. One or more expected attributes of the vehicle at the projected point may be determined from the geometric profile (e.g. yaw, yaw rate, etc.). If the projected position is between the positions associated with adjacent geometric states, interpolation may be used to determine the expected attributes. The current distance along the path/point on the path may be a common parameter present in both the geometric and temporal states. Thus the current position of the vehicle may be mapped onto the temporal profile using the projected distance along the path. One or more expected attributes of the vehicle associated with the projected point may be determined from the temporal profile (e.g. current velocity, velocity at a point in the future, acceleration). Techniques may comprise interpolating between states of the temporal profile to determine attributes associated with the projected position. For example, interpolation may be needed when the number/spacing of temporal states is different to that of the geometric states.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In various other examples, the techniques may be utilized in an aviation or nautical context, and may be incorporated into any ground-borne, airborne, or waterborne vehicle using route planning techniques, including those ranging from vehicles that need to be manually controlled by a driver at all times, to those that are partially or fully autonomously controlled.

FIG. 1 illustrates an example scenario 100-1 including an autonomous vehicle 102 configured to perform the techniques described herein. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification.

The autonomous vehicle 102 may comprise computing device(s) 104 that may include one or more ML models and/or the navigation systems discussed below in relation to FIG. 5. For example, the computing device(s) 104 may comprise a planning component 106. The planning component 106 may be configured to generate a trajectory 108 for the vehicle 102. The planning component 106 may include trajectory optimization components configured to perform stochastic optimization and/or other optimization techniques to determine an optimal path for the autonomous vehicle 102 to traverse a driving environment 150. The planning component 106 also may include, or may invoke, one or more prediction components (e.g., an active prediction ML model) and/or cost evaluation components configured to analyze trajectories that the autonomous vehicle 102 may follow. The planning component 106 may comprise the hardware and/or software for conducting the operations discussed herein related to generating and/or modifying trajectories for the autonomous vehicle 102. In the illustrated example, a trajectory 108 generated by the planning component 106 is received by a trajectory tracker 110. The trajectory tracker may be configured to generate control signals based on the trajectory 108. The control signals may control the vehicle to approximately follow the trajectory 108. In other examples a trajectory 108 generated by the planning component may be received by a secondary component, such as a collision avoidance system. The secondary component may validate and optionally modify the trajectory from the planning component 106. The trajectory tracker 110 may receive the validated trajectory or a modified trajectory from the secondary component.

An example trajectory 108 is illustrated in the example scenario 100-1. The trajectory may comprise (or be defined in part by) a geometric profile comprising a sequence of geometric states 108a-c. The geometric states 108a-e may define a path through the environment 150, here represented by the arrow of trajectory 108. Each state 108a-e may comprise a position within the environment (e.g. position within a map/coordinate system, rather than position with respect to the path), a vehicle heading/yaw, yaw rate, a sideslip and/or a position/distance along the path (e.g. arc length). The geometric states 108a-e may be used by trajectory tracker 110 to control the route taken by the vehicle 102 through the environment 150. However, the geometric states may not define the dynamic properties of how the vehicle 102 should move through the environment 150. Thus the geometric states 108a-e may not define the time at which the vehicle is expected to arrive at a point, the velocity a vehicle should currently be travelling at, or an acceleration (and/or velocity expected for a future point, from which required acceleration may be determined).

Instead, the trajectory 108 may comprise (or be defined in part by) a temporal profile comprising time dependent information. The sequence of temporal states may define expected progress through the environment 150. For example each state may comprise a position/distance along the path (e.g. arc length), a time, a speed, a velocity, and/or an acceleration. For example, a temporal state may define the time at which the vehicle is expected to be at a particular distance along the path, or time derivatives such as velocity. In the illustrated example, the sequence of temporal states is defined to have the same positions along the path as the geometric states, as such the points 108a-d also represent temporal states, though this is for depicted for illustrative purposes only and is not meant to be so limiting. As noted above, geographic and temporal states may differ.

The sequence of temporal states 108a-d may end before the sequence of geometric states. For example, the trajectory 108 may be associated with bringing the vehicle 102 to a stop. For example, the sequence of temporal states may define expected speeds of the vehicle along the path that decrease to zero at a stopping point 112. The stopping point 112 may be a point at which the vehicle is expected to have zero velocity. The stopping point 112 may be associated with a final state 108d in the sequence of temporal states and/or a first temporal state having zero velocity.

Before the stopping point 112, the vehicle 102 may be controlled in accordance with both the geometric and temporal profiles of trajectory 108. For example, the vehicle 102 may be controlled to approximately follow the illustrated path, with velocities as points along the path that are approximately as directed in the sequence of temporal states.

FIG. 1 also illustrates the example scenario at a later time, 100-2. By this time, the vehicle may have moved through the environment 150, slowing towards the stopping point 112. However, as illustrated, the vehicle 102 may overshoot the stopping point 112. There may be no further temporal states with which to control the vehicle 102. However, the geometric states may continue, for example with a geometric state 108e (or any number of geometric states). As such, the path of the trajectory 108 may continue beyond the stopping point 112. The vehicle 102 may be controlled in accordance with geometric profile after the stopping point 112, for example until the vehicle actually comes to a stop. In this way, the vehicle control systems, e.g. trajectory tracker 110, may be provided with continued information about where to drive the vehicle in the event of overshooting the expected stopping point 112. Further, collision avoidance systems may rely on the overshoot contained within the geometric profile to ensure that the vehicle is free of collision even in the event of such an overshoot. As discussed above, the length of path/number of geometric states after the stopping point 112 may be represent a maximum stopping distance, which may be determined based on the environment 150, such as proximal objects in the environment 150.

In the illustrated example, the geometric states and temporal states are co-located at the same positions along the path. In other examples, geometric states may be at different positions to the temporal states. Additionally or alternatively, there may be a different number of geometric states to temporal states, for example a different number within a given length of path. Thus for example, the geometric profile may comprise a higher density of states than the temporal profile. Geometric and/or temporal states may be regularly spaced along the path, or may be at irregular positions. Geometric and/or temporal states may be defined at predetermined distances along the path, such as with spacings of 5 meters, 10 meters, 50 meters, etc. Alternatively geometric and/or temporal states may be defined based on an approximate time between the states, such as 0.1 seconds, 0.2 seconds, 0.5 seconds, 1 seconds etc. Step sizes between the geometric states may be different to step sizes between the temporal states. For example, a step size in a common parameter (e.g. distance along the path/arc length) may be different for the geometric states and the temporal states.

Figure 2:
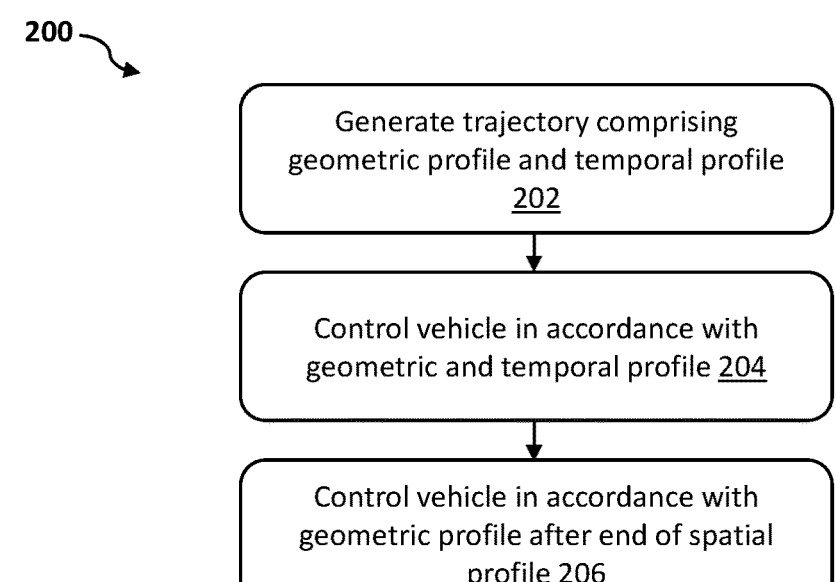
FIG. 2 is a flowchart illustrating a method according to techniques of the present disclosure.

FIG. 2 is a flow diagram illustrating an example method 200 according to techniques of the present disclosure. The method 200 may be performed by components of a vehicle, such as vehicle 102 described above or vehicle 502 described below. Method 200 may be used to control a vehicle overshooting an expected stopping position, as illustrated above in relation to FIG. 1.

Method 200 may comprise operation 202. Operation 202 may comprise generating a trajectory associated with controlling a vehicle in an environment. The trajectory may be associated with bringing the vehicle to a stop. The trajectory may be determined by a planning component of the vehicle. The trajectory may be generated by a secondary component, such as a collision avoidance system. The trajectory may be a contingent trajectory, such as a 'safe-stop' trajectory. The trajectory, which may have been modified from a reference trajectory, which may have been output by a planning component.

The trajectory may comprise a geometric profile and a temporal profile. The geometric profile may comprise a sequence of geometric states defining a time-independent path through the environment. The temporal profile may comprise a sequence of temporal states defining expected progress of the vehicle along the path. An end of the sequence of temporal states (e.g. a final state/first zero-velocity state) may associated with an expected stopping point of the vehicle along the path. The path defined by the sequence of geometric states may extend beyond the expected stopping point, for example as illustrated above in FIG. 1

Method 200 may comprise operation 204. Operation 204 may comprise controlling the vehicle in accordance with the geometric profile and the temporal profile of the trajectory before the end of the sequence of temporal states. For example, a trajectory tracker may determine vehicle controls based on the two profiles.

Method 200 may comprise operation 206. Operation 206 may comprise controlling the vehicle in accordance with the geometric profile after the end of the sequence of temporal states.

Figure 3A:
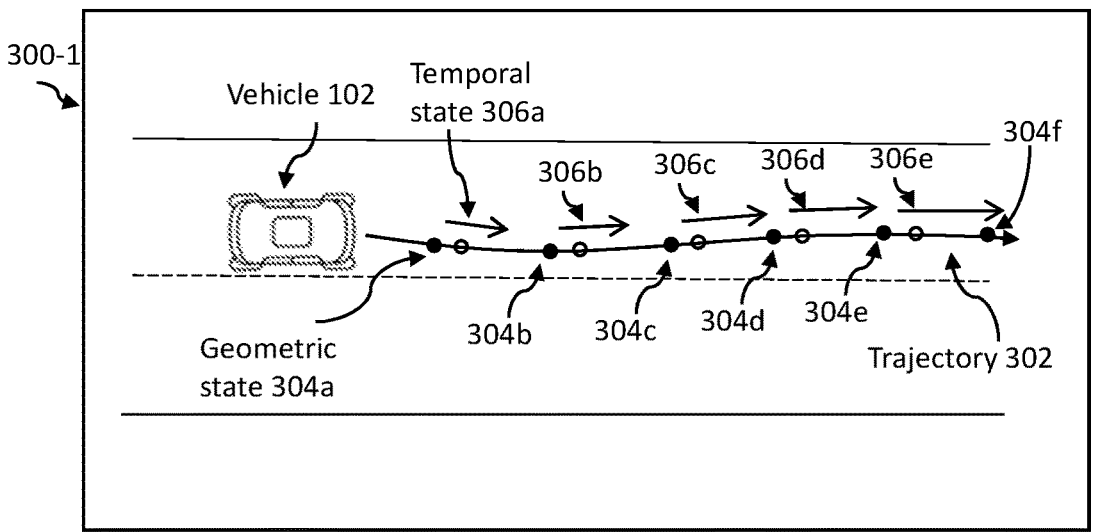
FIGS. 3A and 3B illustrate modification of trajectories according to techniques of the present disclosure.
Figure 3A:
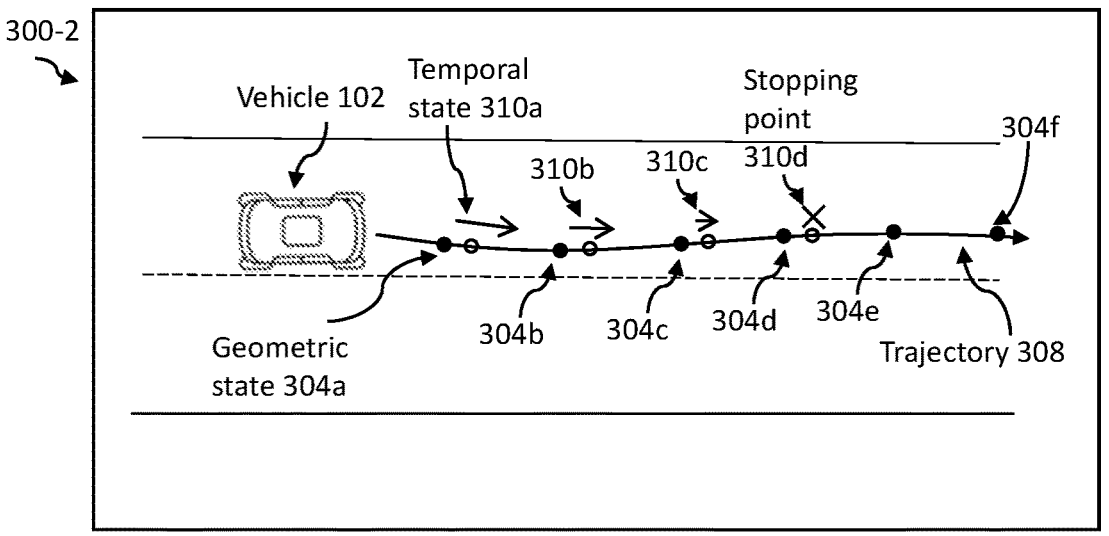
Figure 3B:
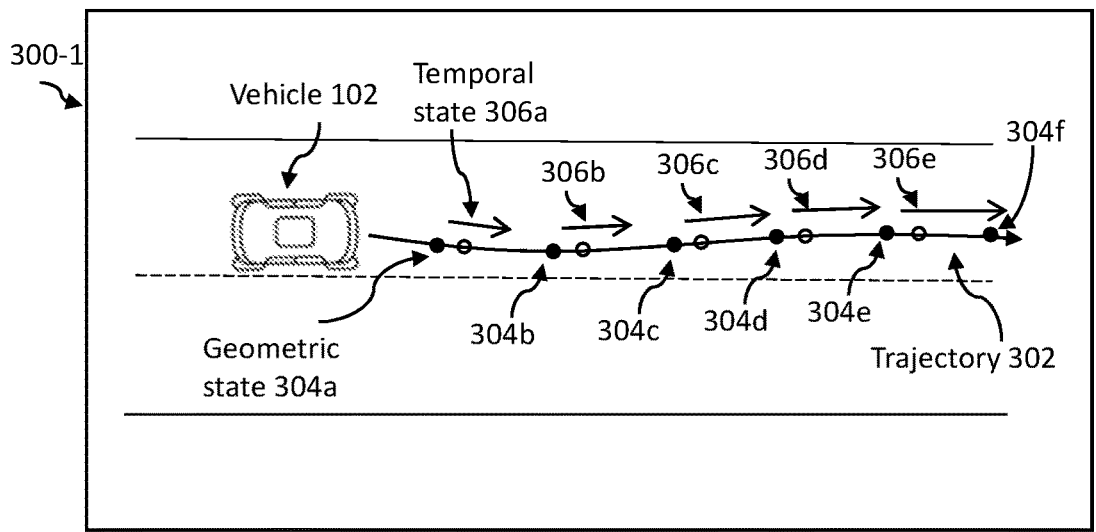
Figure 3B:
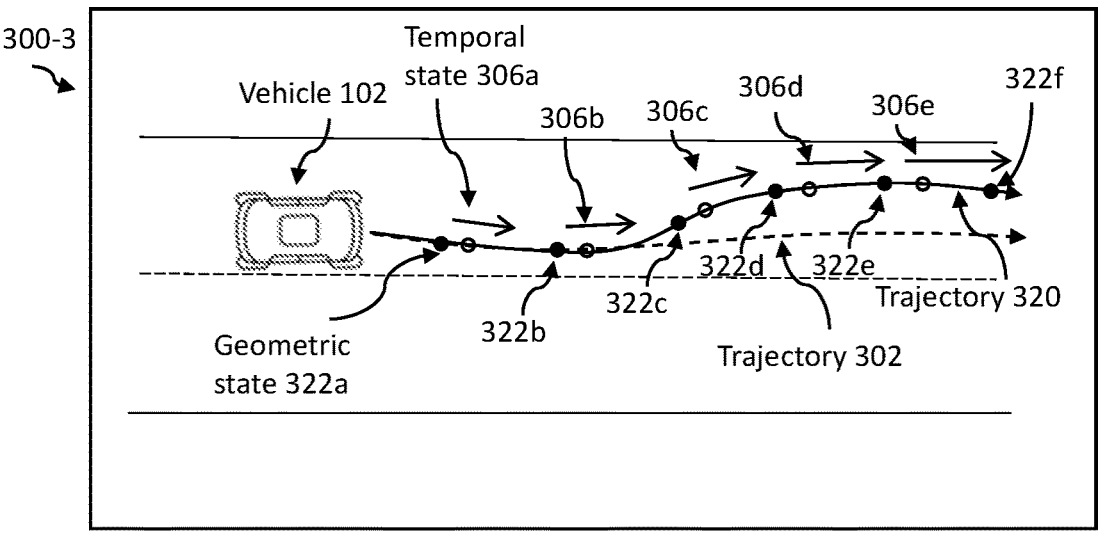

FIGS. 3A and 3B illustrate examples of modifying a trajectory in accordance with techniques of the present disclosure.

FIG. 3A illustrates an example of modifying a temporal profile of a trajectory. Illustrated example 300-1 illustrates an initial trajectory 302 for controlling a vehicle 102. The trajectory 302 may be a trajectory determined by a planning component, for example. The trajectory 302 may comprise a geometric profile. The geometric profile may comprise a sequence of geometric states 304a-f defining a path through the environment. The trajectory 302 may further comprise a temporal profile. The temporal profile may comprise a sequence of temporal states 306a-e defining expected progress of the vehicle along the path. As illustrated, the temporal states 306a-e may be defined at different positions along the path than the geometric states 304a-f. The temporal states 306a-e may comprise an expected velocity of the vehicle, represented in FIG. 1 by the arrows above the example temporal states 306a-e along the path. A larger arrow indicates a higher velocity for that temporal state 306a-e. In the illustrated example, the initial trajectory 102 may direct the vehicle to travel accelerate along a road, illustrated by the increasing length of the arrows above the temporal states 306a-c.

Example 300-2 in FIG. 3A illustrates a modified trajectory 308 determined from the initial trajectory 302. The modified trajectory 308 may for example be determined by a secondary computer component, such as a collision avoidance system. The modified trajectory 308 may be a contingent trajectory, such as a safe-stop trajectory. The modified trajectory may be associated with stopping the vehicle 102. To this end, the temporal profile may be modified. For example, one or more of the temporal states 306a-e of the initial trajectory 302 may be modified to form new temporal states 310a-d. One or more of the new temporal states 310a-d may be the same as the corresponding original temporal states 306a-e, particularly one or more states at the start of the temporal profile. Such examples may allow for delays in processing the changes by the vehicle. The new temporal states 310a-d may be associated with a slowing velocity of the vehicle, as represented by the decreasing size of the arrows above the temporal states 310a-d. The modified temporal profile may define an expected stopping point 310d, similar to expected stopping point 112 described above. The geometric profile, on the other hand, may be unmodified. Thus the modified trajectory 308 may comprise the original geometric states 304a-f. Such examples may maintain a planned path through an environment, whilst modifying temporal properties to being the vehicle to a halt.

FIG. 3B illustrates an example of modifying a geometric profile of a trajectory. Example 300-1 of FIG. 3B shows the same example initial trajectory 302 as FIG. 3A.

Example 300-3 in FIG. 3B illustrates an alternative modified trajectory 320 determined from the initial trajectory 302. The modified trajectory 320 may for example be determined by a planning component of the vehicle 102. For example, trajectory 320 may be an optimized trajectory, such as optimized for the environment in which the vehicle 102 is planning and/or based on one or more driving policies such as safety or comfort policies. In this example, the geometric profile of the initial trajectory 302 may be modified, deriving new geometric states 322a-f. New geometric states 322a-f may define a new path through the environment, as represented by the line of trajectory 320. One or more of the new geometric states 322a-f may be the same as the original geometric states 304a-f, for example to provide for initial delays in implementing the change in path. As illustrated, the temporal states 306a-e may be unmodified. As such, the modified trajectory 320 may comprise the modified geometric states 322a-f and the unmodified temporal states 306a-e. In this example, the vehicle 102 may be directed to travel at the same velocities at the same distances along the path (arc length) as would have been the case for the original trajectory 302; the change in the path may not affect the velocities (and/or other temporal attributes). Such examples may allow for a path to be optimized without having to recompute temporal attributes of a trajectory.

In other examples, both the geometric profile and the temporal profile of a trajectory may be modified, independently of each other. For example, both profiles may be modified by an optimization algorithm. Alternatively or additionally, one of the profiles may be modified by an optimization algorithm, and the other may be modified to generate a contingent trajectory.

Figure 4:
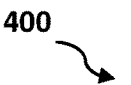
FIG. 4 is a flowchart illustrating a method according to techniques of the present disclosure.
Figure 4:
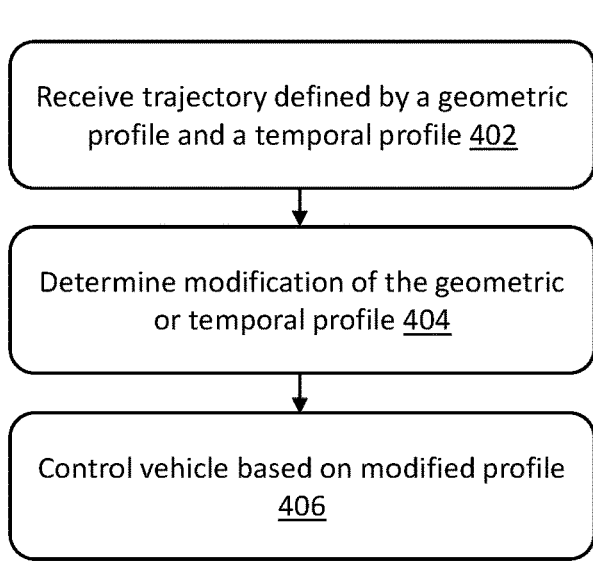

FIG. 4 is a flow diagram illustrating an example method 400 according to techniques of the present disclosure. The method 400 may be performed by components of a vehicle, such as vehicle 102 described above or vehicle 502 described below. Method 400 may be used to control a vehicle in accordance with a modified trajectory, as illustrated above in relation to FIGS. 3A and 3B.

Method 400 may comprise operation 402. Operation 402 may comprise receiving a trajectory (e.g. an initial/base/reference trajectory) associated with controlling a vehicle in an environment. The trajectory be defined by a first geometric profile and a first temporal profile. The geometric profile may comprise a sequence of geometric states defining a path through the environment. The temporal profile may comprise a sequence of temporal states defining expected progress of the vehicle along the path.

Method 400 may comprise operation 404. Operation 404 may comprise determining, as a modified profile, one of the geometric profile or the temporal profile.

Method 400 may comprise operation 406. Operation 406 may comprise controlling the vehicle based at least in part on the modified profile. In some examples, the vehicle may further be controlled based at least in part on the unmodified profile of the other of the geometric profile or temporal profile of the original trajectory.

Figure 5:
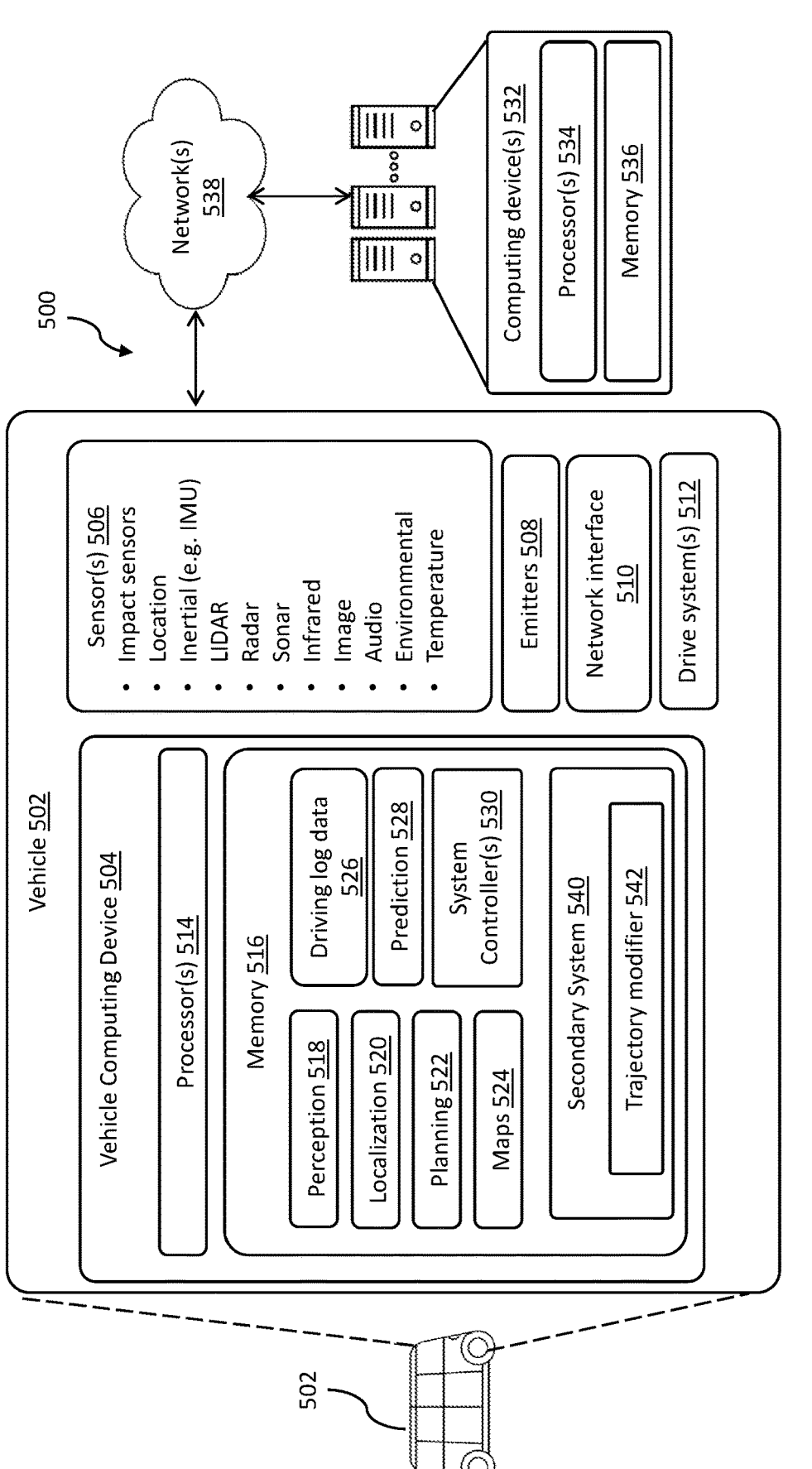
FIG. 5 is a block diagram of an example system for implementing the techniques described herein.

FIG. 5 illustrates a block diagram of an example system 500 that may implement the techniques discussed herein. In some instances, the example system 500 may include a vehicle 502. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well.

The vehicle 502 may include a vehicle computing device(s) 504, sensor(s) 506, emitter(s) 508, network interface(s) 510, and/or drive system(s) 512. Sensor(s) 506 may represent sensor(s) 112. The system 500 may additionally or alternatively comprise computing device(s) 532.

In some instances, the sensor(s) 506 may represent sensor(s) 112 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 506 may include multiple instances of each of these or other types of sensors. For instance, the radar sensors may include individual radar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device(s) 504 and/or to computing device(s) 532.

The vehicle 502 may also include emitter(s) 508 for emitting light and/or sound, as described above. The emitter(s) 508 may include interior audio and visual emitter(s) to communicate with passengers of the vehicle 502. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). The network interface(s) 510 may facilitate communication with other local computing device(s) on the vehicle 502 and/or the drive component(s) 512. The network interface(s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with computing device(s) 532 over a network 538. In some examples, computing device(s) 532 may comprise one or more nodes of a distributed computing system (e.g., a cloud computing architecture).

The vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 512 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device(s) 504 may include processor(s) 514 and memory 516 communicatively coupled with the one or more processors 514. Computing device(s) 532 may also include processor(s) 534, and/or memory 536. The processor(s) 514 and/or 534 may be any suitable processor capable of executing instructions to process data and perform operations as described herein. By way of example and not limitation, the processor(s) 514 and/or 534 may comprise one or more central processing units (CPUs), graphics processing units (GPUS), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 516 and/or 536 may be examples of non-transitory computer-readable media. The memory 516 and/or 536 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 516 and/or memory 536 may store a perception component 518, localization component 520, planning component 522, map(s) 524, driving log data 526, prediction component 528, and/or system controller(s) 530—zero or more portions of any of which may be hardware, such as GPU(s), CPU(s), and/or other processing units.

The perception component 518 may detect object(s) in in an environment surrounding the vehicle 502 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 518 is referred to as perception data. The perception component 518 may be configured to associate a bounding region (or other indication) with an identified object. The perception component 518 may be configured to associate a confidence score associated with a classification of the identified object with an identified object. In some examples, objects, when rendered via a display, can be colored based on their perceived class. The object classifications determined by the perception component 518 may distinguish between different object types such as, for example, a passenger vehicle, a pedestrian, a bicyclist, motorist, a delivery truck, a semi-truck, traffic signage, and/or the like.

In at least one example, the localization component 520 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 520 may include and/or request/receive map(s) 524 of an environment and can continuously determine a location, velocity, and/or orientation of the autonomous vehicle 502 within the map(s) 524. In some instances, the localization component 520 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 520 may provide data to various components of the vehicle 502 to determine an initial position of an autonomous vehicle for generating a trajectory and/or for generating map data, as discussed herein. In some examples, localization component 520 may provide, to the perception component 518, a location and/or orientation of the vehicle 502 relative to the environment and/or sensor data associated therewith.

The planning component 522 may receive a location and/or orientation of the vehicle 502 from the localization component 520 and/or perception data from the perception component 518 and may determine instructions for controlling operation of the vehicle 502 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 530 and/or drive component(s) 512 may parse/cause to be carried out, second instructions for the emitter(s) 508 may be formatted according to a second format associated therewith).

The driving log data 526 may comprise sensor data, perception data, and/or scenario labels collected/determined by the vehicle 502 (e.g., by the perception component 518), as well as any other message generated and or sent by the vehicle 502 during operation including, but not limited to, control messages, error messages, etc. In some examples, the vehicle 502 may transmit the driving log data 526 to the computing device(s) 532. The computing device(s) 532 may identify one or more scenarios based at least in part on the log data, which may also comprise defining a scenario, wherein the scenarios are used to generate a playback simulation. For example, the computing device(s) 532 may determine an environmental layout, a number, type, and a configuration of object(s) in the environment and/or associate this definition with one or more portions of log data associated with that scenario. In some examples, the driving log data 526 may comprise (historical) perception data that was generated on the vehicle 502 during operation of the vehicle.

The prediction component 528 may generate one or more probability maps representing prediction probabilities of possible locations of one or more objects in an environment. For example, the prediction component 528 may generate one or more probability maps for vehicles, pedestrians, animals, and the like within a threshold distance from the vehicle 502. In some examples, the prediction component 528 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 522 may be communicatively coupled to the prediction component 528 to generate predicted trajectories of objects in an environment. For example, the prediction component 528 may generate one or more predicted trajectories for objects within a threshold distance from the vehicle 502. In some examples, the prediction component 528 may measure a trace of an object and generate a trajectory for the object based on observed and predicted behavior. Although prediction component 528 is shown on a vehicle 502 in this example, the prediction component 528 may also be provided elsewhere, such as in a remote computing device as shown in FIG. 5. In some embodiments, a prediction component may be provided at both a vehicle and a remote computing device. These components may be configured to operate according to the same or a similar algorithm.

The memory 516 and/or 536 may additionally or alternatively store a mapping system, a planning system, a ride management system, etc. Although perception component 518 and/or planning component 522 are illustrated as being stored in memory 516, perception component 518 and/or planning component 522 may include processor-executable instructions, machine-learned model(s) (e.g., a neural network), and/or hardware.

In the exemplary illustrated system 500, memory 516 may further comprise a secondary system 540, which may be a collision avoidance system. Secondary system 540 may receive a trajectory, such as a reference trajectory, from the planning component 522. Secondary system 540 may validate such a trajectory. For example, secondary system 540 may check for potential collisions if the vehicle 502 follows the trajectory. For example, secondary system 540 may project a representation of the vehicle along the trajectory, and may detect overlaps between the representation and representations of objects in the environment arounds the vehicle 502. Secondary system 540 may generate one or more contingent trajectories, such as a 'safe stop' trajectory. A contingent trajectory may slow or stop the vehicle 502, for example to avoid a potential collision. In the illustrated example, secondary system 540 comprises a trajectory modifier 542. Trajectory modifier 542 may determine a modified geometric profile and/or a modified temporal profile from a received trajectory. For example, trajectory modifier 542 may modify the geometric and/or temporal profile to generate a contingent trajectory. Trajectory modifier 542 may in some examples modify a trajectory if secondary system 540 detects a potential collision. Trajectory modifier 542 may in general perform any of the methods or techniques described above, and in particular may perform methods 200 or 400 described above. Although illustrated as a separate component, trajectory modifier 542 may represent a processor-executable instructions stored together with the secondary system 540 in memory 516. For example, trajectory modifier 542 may represent one or more logical blocks associated with processor-executable instructions implementing the secondary system 540. In some examples, vehicle 502 may comprise a secondary computing device storing the secondary system 540. The secondary computing device may be separate from the (primary) computing device 504, to provide a secondary safety check on trajectories determined by the (primary) computing device 504.

Although illustrated here as part of a secondary system 540, the techniques of this disclosure for determining modi-fied profiles from trajectories may alternatively or additionally be implemented by planning component 522 or by system controller 530. In general, the techniques disclosed herein, and in particular methods 200 and 400, may be implemented on any component or system of the or a vehicle computing device.

As described herein, the localization component 520, the perception component 518, the planning component 522, the prediction component 528, and/or other components of the system 500 may comprise one or more ML models. For example, the localization component 520, the perception component 518, the planning component 522, and/or the planning component 528 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2. Shufflenet, Channelnet, Peleenet, and/or the like. The ML model may comprise a residual block such as Pixor, in some examples.

Memory 520 may additionally or alternatively store one or more system controller(s) 530, which may be configured to control steering, propulsion, braking, safety, emitters, communication, and other systems of the vehicle 502. These system controller(s) 530 may communicate with and/or control corresponding systems of the drive component(s) 512 and/or other components of the vehicle 502.

It should be noted that while FIG. 5 is illustrated as a distributed system, in alternative examples, components of the vehicle 502 may be associated with the computing device(s) 532 and/or components of the computing device(s) 532 may be associated with the vehicle 502. That is, the vehicle 502 may perform one or more of the functions associated with the computing device(s) 532, and vice versa.

EXAMPLE CLAUSES

A: A system comprising: one or more processors; and one or more non-transitory computer-readable media storing instructions that, when executed, cause the system to perform operations comprising: generating a trajectory associated with controlling a vehicle in an environment to bring the vehicle to a stop, the trajectory defined by a geometric profile and a temporal profile, wherein: the geometric profile comprises a sequence of geometric states defining a time-independent path through the environment, the temporal profile comprises a sequence of temporal states defining expected progress of the vehicle along the path, an end of the sequence of temporal states associated with an expected stopping point of the vehicle along the path, and the path defined by the sequence of geometric states extends beyond the expected stopping point; and controlling the vehicle in accordance with the geometric profile and the temporal profile of the trajectory before the end of the sequence of temporal states, and in accordance with the geometric profile of the trajectory after the end of the sequence of temporal states.

B: The system according to clause A, the operations comprising: determining a current position of the vehicle; projecting the current position of the vehicle onto the path defined by the sequence of geometric states to determine a current distance along the path; interpolating between a first temporal state and a second temporal state of the sequence of temporal states based on the current distance along the path to determine an expected temporal attribute of the vehicle associated with the current distance along the path; and controlling the vehicle based at least in part on the expected temporal attribute of the vehicle.

C: The system according to clause A or clause B, wherein a first geometric state of the sequence of geometric states comprises a position within the environment, a vehicle heading, a path curvature, a sideslip and/or a position along the path.

D: The system according to any of clauses A to C, wherein a first temporal state of the sequence of temporal states comprises a position along the path, a time, a speed, a velocity, and/or an acceleration.

E: A method comprising: receiving a trajectory associated with controlling a vehicle in an environment, the trajectory defined by a geometric profile and a temporal profile, wherein: the geometric profile comprises a sequence of geometric states defining a path through the environment, and the temporal profile comprises a sequence of temporal states defining expected progress of the vehicle along the path; determining, as a modified profile, a modification of one of the geometric profile or the temporal profile; and controlling the vehicle based at least in part on the modified profile.

F: The method according to clause E, wherein a number of geometric states in the geometric profile is different to a number of temporal states in the temporal profile.

G: The method according to clause E or clause F, further comprising determining, based at least in part on the geometric profile, a potential collision wherein the modified profile is a modified temporal profile and is determined further based at least in part on the potential collision.

H: The method according to any of clauses E to G, wherein the geometric profile defines a path extending beyond an expecting stopping position defined in the temporal profile, and wherein the modified profile comprises a modified temporal profile determined to cause the vehicle to stop within a portion of the path extending beyond the expected stopping position.

I: The method according to any of clauses E to H, wherein the modified profile comprises a modified temporal profile, the method further comprising generating a contingent trajectory based on the modified profile and the geometric profile, wherein the contingent trajectory is associated with deceleration of the vehicle and/or a safe stop of the vehicle.

J: The method according to any of clauses E to I, wherein the modified profile is generated by an optimization algorithm.

K: The method according to any of clauses E to J, wherein the geometric profile is mapped to the temporal profile via a common parameter.

L: The method according to clause K, wherein the common parameter is distance along the path.

M: The method according to clause J or clause K, wherein a change in value of the common parameter between a first geometric state and an adjacent second geometric state is different to a change in value of the common parameter between a first temporal state and an adjacent second temporal state.

N: One or more non-transitory computer-readable media storing instructions executable by one or more processors, wherein the instructions, when executed, cause the one or more processors to perform operations comprising: receiving a trajectory associated with controlling a vehicle in an environment, the trajectory defined by a geometric profile and a temporal profile, wherein: the geometric profile comprises a sequence of geometric states defining a path through the environment, and the temporal profile comprises a sequence of temporal states defining expected progress of the vehicle along the path; determining, as a modified profile, a modification of one of the geometric profile or the temporal profile; and controlling the vehicle based at least in part on the modified profile.

O: The one or more non-transitory computer-readable media according to clause N, wherein a first geometric state of the geometric profile comprises a first arc length defining a first distance along the path, and wherein a first temporal state of the temporal profile comprises a second arc length defining a second distance along the path.

P: The one or more non-transitory computer-readable media according to clause N or clause O, the operations comprising: wherein the modified profile comprises a modified geometric profile and a modified temporal profile.

Q: The one or more non-transitory computer-readable media according to any of clauses O to P, wherein the geometric profile specifies expected positions in the environment, vehicle yaw, yaw rate, path curvatures, sideslips and/or positions along the path for the vehicle.

R: The one or more non-transitory computer-readable media according to any of clauses O to Q, wherein the temporal profile specifies expected positions along the path, times, speeds, velocities, and/or accelerations for the vehicle.

S: The one or more non-transitory computer-readable media according to any of clauses O to R, the operations comprising: projecting a current attribute associated with the vehicle onto the modified profile.

T: The one or more non-transitory computer-readable media according to any of clauses O to S, the operations comprising: interpolating between states of the modified profile based on a current expected attribute of the vehicle determined from the geometric profile or the temporal profile.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might." unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:
1. A system comprising:
one or more processors; and
one or more non-transitory computer-readable media storing instructions that, when executed, cause the system to perform operations comprising:

generating a trajectory associated with controlling a vehicle in an environment to bring the vehicle to a stop, the trajectory defined by a geometric profile and a temporal profile, wherein:

the geometric profile comprises a sequence of geometric control states defining a time-independent path through the environment, a geometric control state of the sequence of geometric control states specifying at least a target position or heading for the vehicle to follow, the temporal profile comprises a sequence of temporal control states defining expected progress of the vehicle along the path, a temporal control state of the sequence of temporal control states defining at least a target velocity or acceleration for the vehicle, an end of the sequence of temporal control states associated with an expected stopping point of the vehicle along the path, wherein the geometric profile is modifiable independently of the temporal profile and the path defined by the sequence of geometric control states extends beyond the expected stopping point, and wherein the sequence of temporal control states terminates at the expected stopping point; and controlling the vehicle in accordance with the geometric profile and the temporal profile of the trajectory before the end of the sequence of temporal control states, and in accordance with the geometric profile of the trajectory and not the temporal profile after the end of the sequence of temporal control states.

2. The system of claim 1, the operations comprising:

determining a current position of the vehicle;

projecting the current position of the vehicle onto the path defined by the sequence of geometric control states to determine a current distance along the path;

interpolating between a first temporal control state and a second temporal control state of the sequence of temporal control states based on the current distance along the path to determine an expected temporal attribute of the vehicle associated with the current distance along the path; and controlling the vehicle based at least in part on the expected temporal attribute of the vehicle.

3. The system of claim 1, wherein a first geometric control state of the sequence of geometric control states comprises a position within the environment, a vehicle heading, a path curvature, a sideslip and/or a position along the path.

4. The system of claim 1, wherein a first temporal control state of the sequence of temporal control states comprises a position along the path, a time, a speed, a velocity, and/or an acceleration.

5. A method comprising:

receiving a trajectory associated with controlling a vehicle in an environment, the trajectory defined by a geometric profile and a temporal profile, wherein:

the geometric profile comprises a sequence of geometric control states defining a path through the environment, and the temporal profile comprises a sequence of temporal control states defining expected progress of the vehicle along the path, the geometric profile modifiable independently of the temporal profile;

determining, as a modified profile, a modification of one of the geometric profile or the temporal profile; and controlling the vehicle based at least in part on the modified profile.

6. The method of claim 5, wherein a number of geometric control states in the geometric profile is different to a number of temporal control states in the temporal profile.

7. The method of claim 5, further comprising:

determining, based at least in part on the geometric profile, a potential collision, wherein the modified profile is a modified temporal profile and is determined further based at least in part on the potential collision.

8. The method of claim 5, wherein the geometric profile defines a path extending beyond an expected stopping position defined in the temporal profile, and wherein the modified profile comprises a modified temporal profile determined to cause the vehicle to stop within a portion of the path extending beyond the expected stopping position.

9. The method of claim 5, wherein the modified profile comprises a modified temporal profile, the method further comprising generating a contingent trajectory based on the modified profile and the geometric profile, wherein the contingent trajectory is associated with deceleration of the vehicle and/or a safe stop of the vehicle.

10. The method of claim 5, wherein the modified profile is generated by an optimization algorithm.

11. The method of claim 5, wherein the geometric profile is mapped to the temporal profile via a common parameter.

12. The method of claim 11, wherein the common parameter is distance along the path.

13. The method of claim 11, wherein a change in value of the common parameter between a first geometric control state and an adjacent second geometric control state is different to a change in value of the common parameter between a first temporal control state and an adjacent second temporal control state.

14. One or more non-transitory computer-readable media storing instructions executable by one or more processors, wherein the instructions, when executed, cause the one or more processors to perform operations comprising:

receiving a trajectory associated with controlling a vehicle in an environment, the trajectory defined by a geometric profile and a temporal profile, wherein:

the geometric profile comprises a sequence of geometric control states defining a path through the environment, and the temporal profile comprises a sequence of temporal control states defining expected progress of the vehicle along the path, the geometric profile modifiable independently of the temporal profile;

determining, as a modified profile, a modification of one of the geometric profile or the temporal profile; and controlling the vehicle based at least in part on the modified profile.

15. The one or more non-transitory computer-readable media of claim 14, wherein a first geometric control state of the geometric profile comprises a first arc length defining a first distance along the path, and wherein a first temporal control state of the temporal profile comprises a second arc length defining a second distance along the path.

16. The one or more non-transitory computer-readable media of claim 14, wherein the modified profile comprises a modified geometric profile and a modified temporal profile.

17. The one or more non-transitory computer-readable media of claim 14, wherein the geometric profile specifies expected positions in the environment, vehicle yaw, yaw rate, path curvatures, sideslips and/or positions along the path for the vehicle.

18. The one or more non-transitory computer-readable media of claim 14, wherein the temporal profile specifies expected positions along the path, times, speeds, velocities, and/or accelerations for the vehicle.

19. The one or more non-transitory computer-readable media of claim 14, the operations comprising:

projecting a current attribute associated with the vehicle onto the modified profile.

20. The one or more non-transitory computer-readable media of claim 14, the operations comprising:

interpolating between states of the modified profile based on a current expected attribute of the vehicle determined from the geometric profile or the temporal profile.

* * * * *